Aug. 26, 1969  A. H. HERMANNS  3,462,795
DOUBLE BELT FOR MANUFACTURE OF PANELS AND THE LIKE
Filed Sept. 18, 1967  3 Sheets-Sheet 1

INVENTOR.
ALFRED H. HERMANNS
BY
ATTORNEY

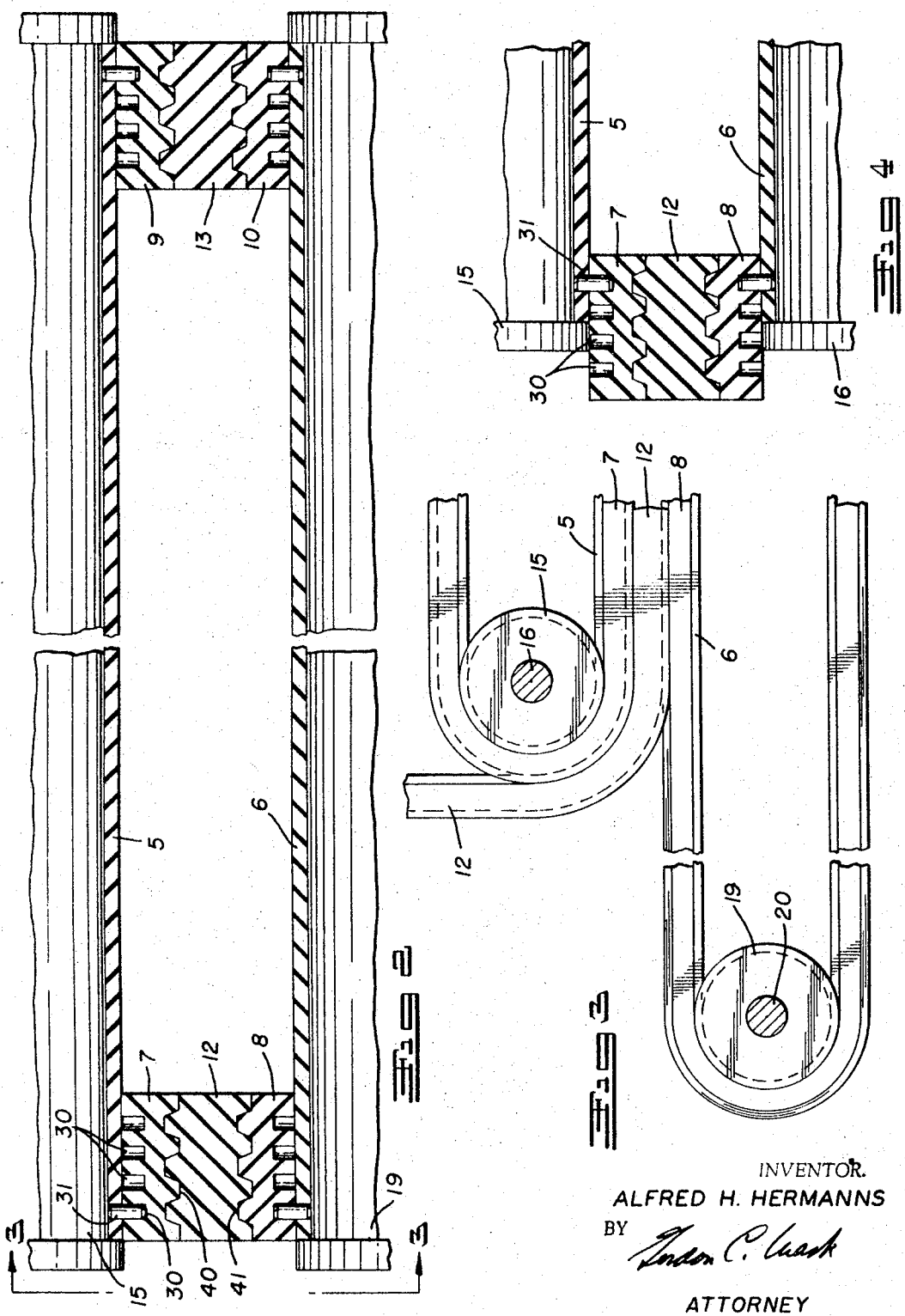

United States Patent Office 3,462,795
Patented Aug. 26, 1969

3,462,795
DOUBLE BELT FOR MANUFACTURE OF PANELS AND THE LIKE
Alfred Hans Hermanns, Akron, Ohio, assignor to Admiral Equipment Corp., Akron, Ohio, a corporation of Ohio
Filed Sept. 18, 1967, Ser. No. 668,442
Int. Cl. B29c 15/00
U.S. Cl. 18—4                              7 Claims

ABSTRACT OF THE DISCLOSURE

The side edges of the space between the belts of a double-belt conveyor for forming a panel or the like from a settable foam, are defined by thickness separators attached to the edges of both belts. These have mating serrated faces, and continuous spacing belts with mating serrated faces are located between them. Spacing belts of different thickness are used to provide spaces of different thicknesses between the conveyor belts. Or the separators may be omitted and the edges of the conveyor belts may be serrated to mate the serrations in the faces of the spacing belts. If separators are used, the means for attaching the separators to the conveyor belts is preferably such that the width of the space between the separators at opposite edges of the conveyor belts may be adjusted.

---

This invention relates to a double-belt conveyor to be used in the formation of panels and the like from foamed plastic under pressure.

In the manufacture of sandwich panels and other panels, a double-belt conveyor has been used to maintain pressure on the horizontal faces of the panel as the plastic is foamed between them in order to produce panels of uniform thickness. Separators are used at opposite edges of both belts to space the belts to form the panels of a desired thickness. It has been necessary to use separators of different thicknesses to produce panels of different thickness are used at opposite edges of both belts, and the According to this invention, separators of a given thickness are used at opposite edges of both belts, and the contacting faces of these separators are serrated. Spacing belts of any required thickness, with faces mating the serrated faces of the separators are located between the separators to produce panels of a desired thickness. Alternatively, the separators may be omitted and spacing belts may be used between conveyor belts with edges serrated to mate the serrated faces of the spacing belts.

Also, the interface between the separators and the conveyor belts at one or both edges of these belts may be provided with means for adjusting the space between the separators at opposite edges of the conveyor belts so as to produce panels of different thicknesses.

The serrations may be of any design, but each spacing belt is longitudinally uniform. The serrations in the mating surfaces of the separators and spacing belts, where such belts are employed, may have squared or pointed or rounded projections and depressions of any suitable number in order to insure mating of the serrations, on order to produce solid side walls to define the space between the conveyor belts in which the plastic is foamed.

Any settable foamable liquid may be used. Polyurethane precursor is preferred because when properly compounded it sets quickly to a hard foam on exposure to the air, as is known in the art. Other settable plastics may be used which are liquid before becoming set.

The invention is further described in connection with the accompanying drawings, in which—

Figure 1:
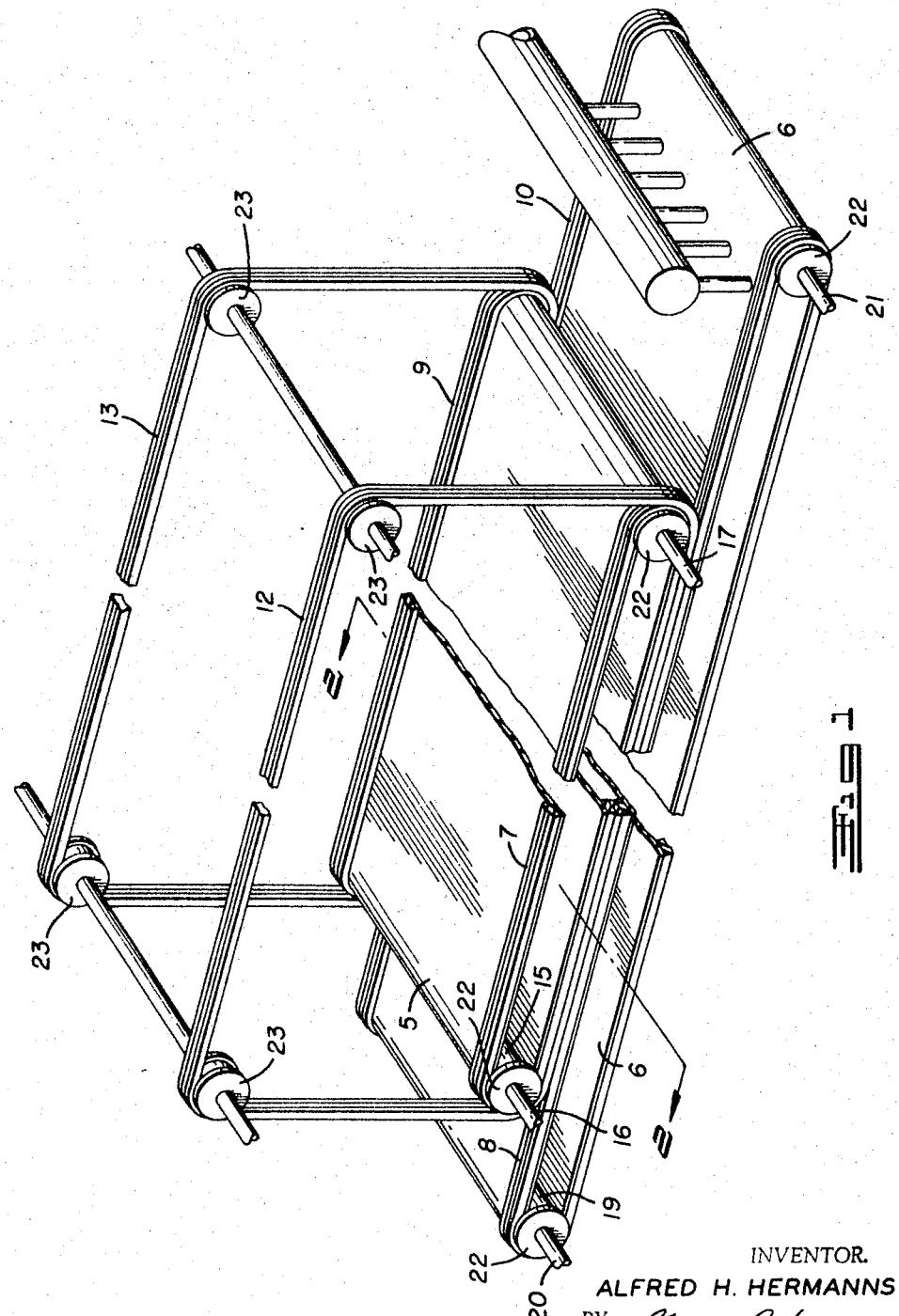
Figure 5:
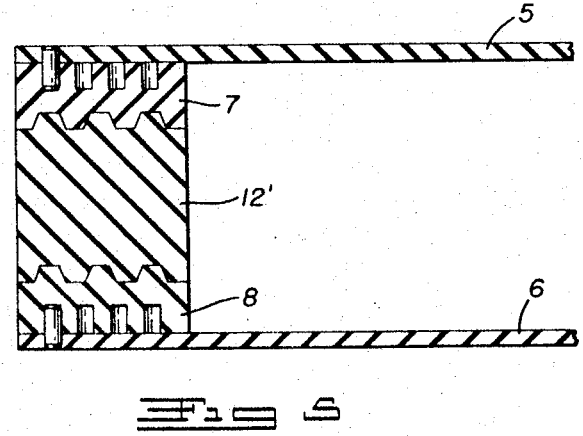
Figure 6:
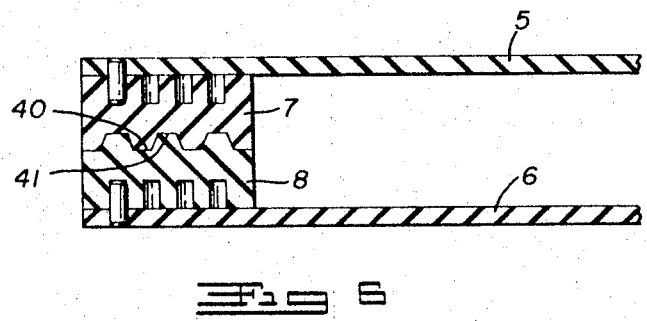
Figure 7:
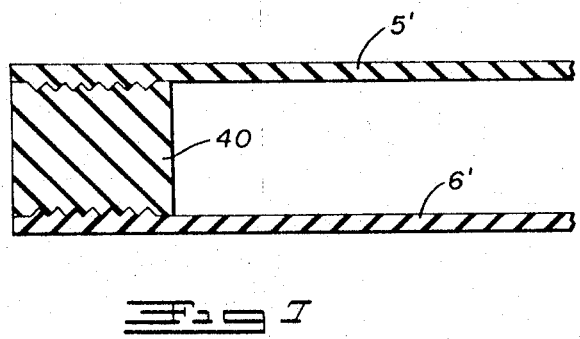

FIGURE 1 is a perspective view of apparatus that may be employed;

FIGURE 2 is a section on the line 2—2 of FIGURE 1;
FIGURE 3 is a side elevation on the line 3—3 of FIGURE 2;
FIGURE 4 is a section through a modification in which one of the separators has been offset;
FIGURE 5 is a modification in which a thicker spacing belt is employed;
FIGURE 6 is a modification in which no spacing belt is used; and
FIGURE 7 is a modification in which no separators are used.

The continuous conveyor and forming belts 5 and 6 may be of any usual construction. The mating serrated separators 7 and 8, and the mating serrated separators 9 and 10 may be formed integrally with the belts, but they are preferably separately formed and positioned at the edges of the belts by means disclosed below. Between the pair of separators 7, 8 and 9, 10 are the spacing belts 12 and 13. Both faces of these belts are serrated to mate with the serrations of the separators.

The conveyor belt 5 is supported by rolls 15 (only one of which is shown) mounted on shafts 16 and 17, supported in suitable bearings, not shown. The belt 6 is similarly mounted about rolls 19 (only one of which is shown) supported on shafts 20 and 21. Circular guides 22 fastened to rolls 15 and 19 prevent the belts from shifting on the rolls. Usually the shaft 20 will be driven by means not shown, and one of the shafts 16 and 17 will usually be driven. The spacing between the belts 5 and 6 is maintained by pressure means, not shown, because the use of double belts to regulate the thickness of setting foaming plastic is known.

The spacing belts 12 and 13, in the lower horizontal portions thereof, are between the separators and are in pressure contact with them, and they move continuously about the sheaves 23 mounted on shafts 24 and 25 both of which are usually idler shafts.

The polyurethane precursor or other plastic, compounded with a foaming material and other compounding reagents as required, is introduced through the header 30 into the pipes 31 which deliver it between the two belts 5 and 6. As the plastic leaves the pipes 31 it foams almost instantaneously and sets immediately on contact with the air. The pressure on the portions of the belts 5 and 6 in which the foaming occurs keeps the foam of uniform thickness as it sets.

Although the panels may be composed entirely of foam, the apparatus is adapted for the manufacture of sandwiched panels, and in this case the top and bottom skins will be supplied from rolls or the like which feed the skins in contact with the belts 5 and 6 above and below a foaming material. In the case of panels which are partitioned longitudinally, partitioning material is supplied as required between the two belts. The use of such sandwiching and partitioning materials is known in the art and, therefore, is not illustrated.

Sections such as that shown in FIGURE 2 illustrate optional locating means at the interface between the separators and the conveyor belts. The purpose is to make it possible to readily adjust the spacing between the separators. Although FIGURE 2 shows the separators at each edge of the conveyor belts as being provided with means for adjusting their positions laterally, so as to produce panels of different widths, it is of course only necessary that the separators at one edge be made adjustable for this purpose. In order to provide for adjustment, openings 30 are shown laterally across the separators, and these openings are provided throughout the entire lengths of the separators, and longitudinally thereof are spaced at somewhat greater distances than suggested in FIGURE 2 for the lateral spacing. There is a row of dowel pins 31 anchored in the belt at each edge of each belt, and any of the rows of openings 30 can be placed over the pins 31. In order to do this, the tension on the belt will be slackened somewhat and the separator can then be separated from the belt, and then replaced as desired to give a required lateral spacing between the separators at the opposite edges of the belt. The belt will then be tightened so that the row of pins 31 will be engaged in the desired row of openings to give the required spacing between the separators. The belt will then again be placed under tension so that the separator will become firmly anchored in the desired position.

The serrations 40 in one of the separators at each edge of the conveyor belt meshes with the separations 41 in the other separator when the spacing belt is omitted. This is best illustrated in FIGURE 6 in which the spacing belt 12 has been omitted. Thus, the space between the conveyor belts 5 and 6 in FIGURE 6 is much less than the space between the belts 5 and 6 in FIGURE 2 in which a spacing belt is used. A much wider spacing is provided in FIGURE 5 by using a belt 12' of greater thickness than the belt 12 of FIGURE 2.

FIGURE 4 shows belts 5 and 6 spaced the same distance as in FIGURE 2, but the dowel pins 31 are engaged in the inner row of openings 30 instead of the outer row, and thus the space to accommodate the foamed plastic is widened.

The separators may be omitted altogether if the edges of the conveyor belts, such as the belts 5' and 6' of FIGURE 7 are serrated, and a spacing belt 40 with mating serrations is located between them. Panels of different thicknesses are prepared by using spacing belts of different thicknesses.

The invention is covered in the claims which follow.

I claim:
1. A double-belt, continuous conveyor for the pressure formation of panels from a settable foamed plastic, which conveyor comprises at each edge of the facing surfaces of the belts a replaceable thickness separator, the facing surfaces of each two facing separators being longitudinally uniform and matingly serrated to prevent the flow of liquid therebetween.

2. The conveyor of claim 1 in which the separators are continuous.

3. The conveyor of claim 1 in which the separators are each divided laterally into many sections which mate with one another on the facing surfaces of the belts.

4. The conveyor of claim 1 in which a continuous spacing belt is located between each two facing separators, the belts having serrated surfaces which mate with the serrated surfaces of the respective separators.

5. The conveyor of claim 1 in which at the interface between the separators and belt at at least one edge of the belt there is means for attaching the separators at different locations with respect to said edge of the belt.

6. A double-belt, continuous conveyor with replaceable separators at the edges of the belt, said separators having mating serrated faces, and means for attaching the separators to the belt at different positions with respect to the edges of the belt.

7. A double-belt, continuous conveyor with the opposed edges of each belt serrated, and a continuous spacing belt between the serrations at each edge of the belt, opposite faces of the spacing belts being serrated with serrations which mesh with the serrations at the edges of the respective conveyor belts.

References Cited

UNITED STATES PATENTS 2,668,987 2/1954 Harris et al.
2,817,875 12/1957 Harris et al.
3,257,484 1/1966 Barnette.

WILLIAM J. STEPHENSON, Primary Examiner